US008250117B2

(12) United States Patent
Olivieri et al.

(10) Patent No.: US 8,250,117 B2
(45) Date of Patent: Aug. 21, 2012

(54) PROCESSING A SPREADSHEET FOR STORAGE IN A DATABASE

(75) Inventors: Ricardo N. Olivieri, Austin, TX (US); Mark B. Whelan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 12/125,264

(22) Filed: May 22, 2008

(65) Prior Publication Data

US 2008/0222196 A1 Sep. 11, 2008

Related U.S. Application Data

(63) Continuation of application No. 11/348,906, filed on Feb. 7, 2006, now abandoned.

(51) Int. Cl.
*G06F 17/30* (2006.01)
(52) U.S. Cl. ......... 707/804; 707/803; 715/212; 715/235
(58) Field of Classification Search .................. 715/212, 715/235, 248; 707/800, 803–805
See application file for complete search history.

(56) References Cited

U.S. PATENT DOCUMENTS

| 5,293,615 | A | | 3/1994 | Amada |
| 5,806,078 | A | * | 9/1998 | Hug et al. .................... 715/205 |
| 5,819,293 | A | | 10/1998 | Comer et al. |
| 5,966,716 | A | | 10/1999 | Comer et al. |
| 6,134,563 | A | * | 10/2000 | Clancey et al. ............... 715/210 |
| 6,292,811 | B1 | | 9/2001 | Clancey et al. |
| 6,988,241 | B1 | * | 1/2006 | Guttman et al. .............. 715/220 |
| 7,117,043 | B1 | * | 10/2006 | Frederick et al. ............... 700/21 |
| 7,197,696 | B1 | * | 3/2007 | Muzumdar ................... 715/209 |
| 7,533,118 | B2 | * | 5/2009 | Chaudri .............................. 1/1 |
| 7,693,860 | B2 | * | 4/2010 | Babanov et al. .............. 715/212 |
| 2004/0088650 | A1 | * | 5/2004 | Killen et al. ................... 715/503 |
| 2005/0022111 | A1 | * | 1/2005 | Collet et al. ................... 715/503 |

OTHER PUBLICATIONS

Non-Final Office Action of U.S. Appl. No. 11/348,906 (Assignee's abandoned application), Apr. 10, 2009, USPTO, Alexandria, VA, USA.

* cited by examiner

*Primary Examiner* — Mohamed Ibrahim
(74) *Attorney, Agent, or Firm* — Garg Law Firm, PLLC; Rakesh Garg; Mark C. Vallone

(57) ABSTRACT

Generally speaking, systems, methods and media for processing a spreadsheet for storage in a database are disclosed. Embodiments may include a method for processing records of a spreadsheet by receiving a request to process a spreadsheet having a plurality of records for storage in a database. Embodiments may also include accessing a configuration file associated with the spreadsheet and, for each record of the spreadsheet, creating a new business object and populating the new business object based on the record and the configuration file associated with the spreadsheet. Embodiments may also include passing each new business object to a back-end business component for processing. The configuration file may include a name of a business object associated with a record of the spreadsheet, metadata for one or more columns of the spreadsheet, and/or a name of a back-end business component associated with the spreadsheet.

17 Claims, 5 Drawing Sheets

PROCESSING A SPREADSHEET FOR STORAGE IN A DATABASE

CROSS-REFERENCES TO RELATED APPLICATIONS

Pursuant to 35 USC §120, this continuation application claims priority to and benefit of U.S. patent application Ser. No. 11/348,906, entitled "SYSTEMS, METHODS, AND MEDIA FOR PROCESSING A SPREADSHEET FOR STORAGE IN A DATABASE", filed on Feb. 7, 2006 now abandoned, the disclosure of which is incorporated herein in its entirety for all purposes.

FIELD OF INVENTION

The present invention is in the field of data processing systems and, in particular, to systems, methods and media for processing a spreadsheet for storage in a database, such as by processing spreadsheet records into back-end applications.

BACKGROUND

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together.

Networks such as the Internet and corporate intranets provide a mechanism for users to transfer data among computers for information sharing, workplace collaboration, data collection, etc. Users gain access to networks such as the Internet by accessing a web server via personal Internet service providers (ISP's), broadband network connections, or high speed network connections through office systems. Typically, a user will view Internet or intranet content using a graphic browser application such as Microsoft Corporation's Internet Explorer™, Netscape Communication Corporation's Navigator™, Mozilla Foundation's Mozilla, Apple Corporation's Safari™, etc. Browsers, at their most basic level of operation, permit users to connect to a given network site, download informational content from that site, and display that information to the user. To view additional information, the user designates a new network address (such as by selecting a link) whose contents then replace the previously displayed information on the user's computer display.

Users often interact with an application server of an organization via a network. An application server is a server computer in a computer network dedicated to running particular software applications such as an organization's back-end business applications or databases. An application server typically has built-in redundancy, high performance, and support for complex database access. An example application server is International Business Machine's (IBM®'s) WebSphere® Application Server (WAS) that may serve as middleware to set up, operate, and integrate e-business applications across multiple computing platforms using Web technologies. Application servers may utilize, for example, a database management system such as IBM®'s DB2® Universal Database or Xara Online's (a subsidiary of Xara Group Ltd. of Hemel Hempstead, UK) Web applications to build a database platform or other remotely hosted applications. These database management systems allow users with appropriate authorization to add or update database records via a user interface, which is often browser-based.

Users often desire to add or update multiple records in a back-end database. To do so directly, a user may typically enter a user id and password and directly access the database to modify the records via add/update pages of a user interface of the back-end application. Having to navigate in the user interface for each record a user would like to update, however, can be very time consuming and inefficient. Accordingly, many back-end applications allow users to upload spreadsheets to add or update multiple records (with each record indicating a change to the database) in a database simultaneously, reducing the time necessary for users to perform this task when compared to manual entry. For example, current solutions such as IBM®'s DB2® Universal Database, or Xara Online's Web applications allow users to connect directly to a database back-end to update or add records by synchronizing the contents of a Microsoft Corporation's® Microsoft Excel® spreadsheet with the database. For applications with validation or business processes requirements, however, this approach is not satisfactory.

When validation or business processes requirements exist, synchronization with a spreadsheet using current solutions suffers from a number of drawbacks. One fault of current solutions is that all applications users who need to add or update records require direct access to the database, requiring a user id and password for direct database access plus assignment of privileges and rights to each one of them at the database level, an unwieldy and undesirable solution. Moreover, all validation and business processes would need to be written at the database layer, resulting in a solution that is not very portable and is thus inefficient. There is, therefore, a need for an efficient and effective mechanism for processing a spreadsheet for storage in a database.

SUMMARY OF THE INVENTION

The problems identified above are in large part addressed by systems, methods and media for processing a spreadsheet for storage in a database. Embodiments may include a method for processing records of a spreadsheet that includes receiving a request to process a spreadsheet with a plurality of records for storage in a database. Embodiments may also include accessing a configuration file associated with the spreadsheet and, for each record of the spreadsheet, creating a new business object and populating the new business object based on the record and the configuration file associated with the spreadsheet. Embodiments may also include passing each new business object to a back-end business component for processing. A further embodiment may include generating the configuration file for the spreadsheet before accessing the configuration file. The configuration file may include a name of a business object associated with each record of the spreadsheet, metadata for one or more columns of the spreadsheet, and/or a name of a back-end business component associated with the spreadsheet.

Another embodiment provides a machine-accessible medium containing instructions effective, when executing in a data processing system, to cause the system to perform a series of operations for processing records of a spreadsheet. The series of operations generally includes receiving a request to process a spreadsheet having a plurality of records for storage in a database. Embodiments may also include a series of operations for accessing a configuration file associated with the spreadsheet and, for each record of the spreadsheet, creating a new business object and populating the new business object based on the record and the configuration file associated with the spreadsheet. Embodiments may also include a series of operations for passing each new business object to a back-end business component for processing. A further embodiment may include a series of operations for generating the configuration file for the spreadsheet before accessing die configuration file.

A further embodiment provides a spreadsheet record processing system. The spreadsheet record processing system may generally include a spreadsheet interface to access a spreadsheet having one or more records and a configuration file database having a configuration file associated with the spreadsheet, the configuration file having information relating to processing of the spreadsheet. The spreadsheet record processing system may also include a processing engine in communication with the configuration file database and the spreadsheet interface to create and populate a new business object based on one of the spreadsheet records and the configuration file associated with the spreadsheet. The spreadsheet record processing system may also include a back-end application interface in communication with the processing engine to pass the created new business object to a back-end business component of a back-end application. In a further embodiment, the spreadsheet record processing system may include a configuration file generator to generate and store a configuration file for a spreadsheet based on inputs received from a user.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

Figure 1:
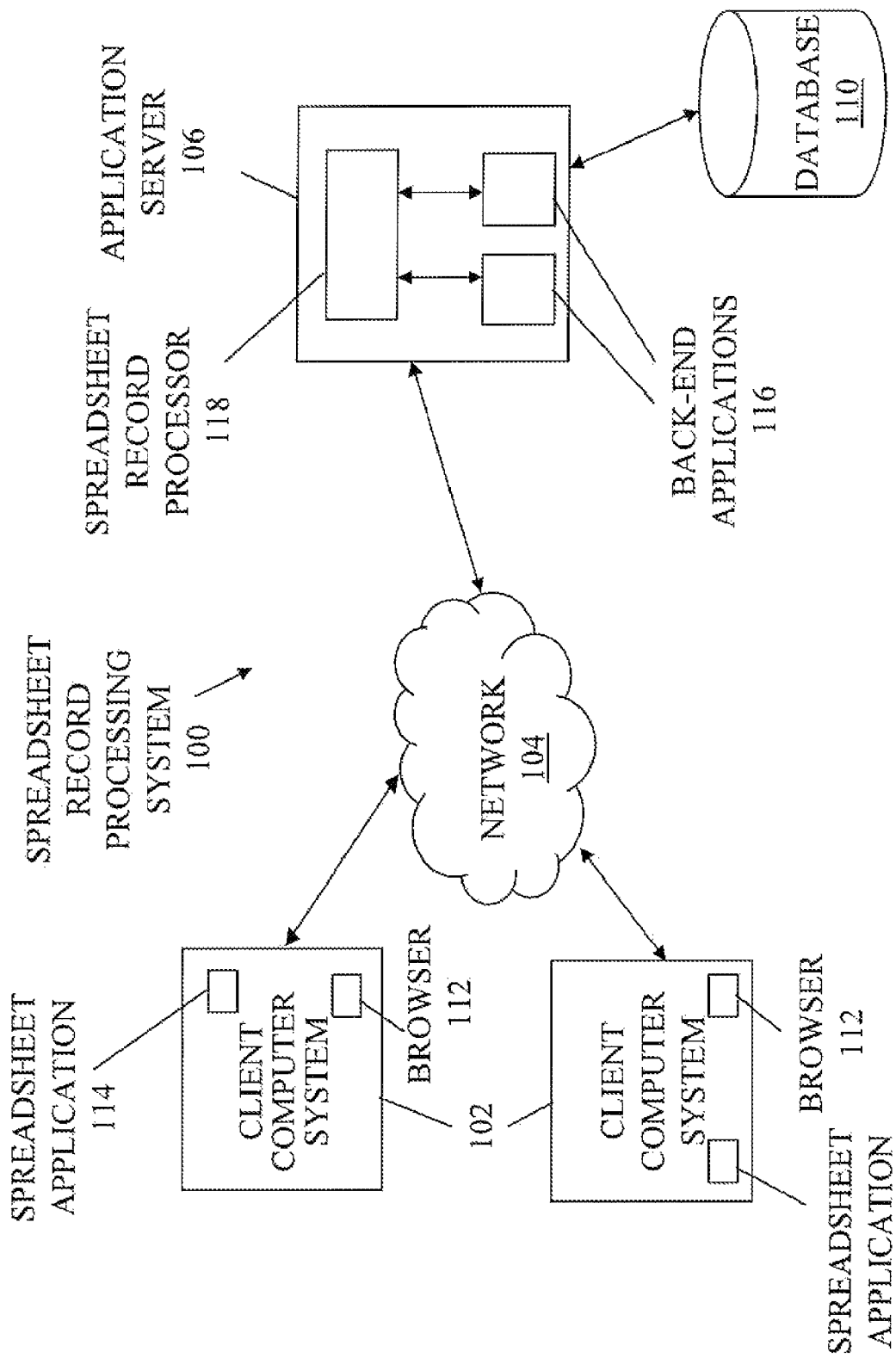
FIG. 1 depicts an environment for a spreadsheet record processing system with a spreadsheet record processor according to one embodiment.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for processing a spreadsheet for storage in a database are disclosed. Embodiments may include a method for processing records of a spreadsheet by receiving a request to process a spreadsheet having a plurality of records for storage in a database. Embodiments may also include accessing a configuration file associated with the spreadsheet and, for each record of the spreadsheet, creating a new business object and populating the new business object based on the record and the configuration file associated with the spreadsheet. Embodiments may also include passing each new business object to a back-end business component for processing. A further embodiment may include generating the configuration file for the spreadsheet before accessing the configuration file. The configuration file may include a name of a business object associated with a record of the spreadsheet, metadata for one or more columns of the spreadsheet, and/or a name of a back-end business component associated with the spreadsheet.

The system and methodology of the disclosed embodiments provides for an effective and efficient way of processing records of a spreadsheet. By automatically processing the records of a spreadsheet and submitting each record to application back-end components, existing validation and business process logic of back-end business components may be utilized. This may allow the use of the same components for validation and business processes execution as if the record was directly entered through the application's user interface, eliminating the need to develop database-layer validation and business process code. A user may efficiently include many changes to a database in a spreadsheet and may thus avoid inefficient manual entry of changes. The disclosed embodiments may also include a usability tool to facilitate creation of a configuration file for a particular spreadsheet by gathering information from a software engineer, potentially resulting in easier generation of spreadsheet-specific configuration files by software engineers.

While specific embodiments will be described below with reference to particular configurations of hardware and/or software, those of skill in the art will realize mat embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Turning now to the drawings, FIG. 1 depicts an environment for a spreadsheet record processing system with a spreadsheet record processor according to one embodiment. In the depicted embodiment, the spreadsheet record processing system 100 includes a plurality of client computer systems 102 in communication with an application server 106 via a network 104. The application server 106 may contain one or more back-end applications 116 to provide content, information, or services to be displayed to a user of the client computer systems 102. Optional database 110 may be in communication with the application server 106 for storage of back-end databases, configuration files, or other information. As will be described in more detail subsequently, a user of a client computer system 102 may submit a spreadsheet with updates or additions to database records to a spreadsheet record processor 118 of the application sever 106 for processing, resulting in an effective mechanism for processing records of a spreadsheet to update a database. The spreadsheet record processor 118 may be a stand-alone application or some or all of its components and functionalities may be integrated into a back-end application 116 or other component.

In the spreadsheet record processing system 100, any of the client computer systems 102, the application server 106, and the database 110 may be located at the same location, such as in the same building or computer lab, or could be remote. While the term "remote" is used with reference to the distance between the components of the spreadsheet record processing system 100, the term is used in the sense of indicating separation of some sort, rather than in the sense of indicating a large physical distance between the systems. For example, any of the components of the spreadsheet record processing system 100 may be physically adjacent or located as part of the same computer system in some network arrangements, such as when the application server 106 and the database 110 are part of the same computer system.

Client computer system 102 may include one or more personal computers, workstations, severs, mainframe computers, notebook or laptop computers, desktop computers, PDAs, set-top boxes, mobile phones, wireless devices, or the like. In some embodiments, client computer system 102 may be a computer system as described in relation to FIG. 2. The client computer system 102 may be in wired or wireless communication with network 104. Each client computer system 102 may include a browser 112 to allow a user of the client computer system 102 to access and view information on various network sites and to interact with the user interface of a back-end application 116 of the application server 106. Browser 112 may be a graphical browser application that allows a user to view Internet or intranet content such as Microsoft Corporation's Internet Explorer™, Netscape Communication Corporation's Navigator™, Mozilla Foundation's Mozilla, Apple Corporation's Safari™, etc. Using a browser 112, a user may also interact with the spreadsheet record processor 118 to load a spreadsheet and to request processing of that spreadsheet by the spreadsheet record processor 118. The client computer systems 102 may also include a spreadsheet application 114, which may be an application such as Microsoft Corporation's® Microsoft Excel® spreadsheet application that performs various computational tasks on a table, or spreadsheet, of information. As used herein, a spreadsheet application 114 may perform tasks on a table of information stored in a file, known as a spreadsheet.

Network 104 may be any type or combination of data communications channels, such as the Internet, an intranet, a LAN, a WAN, an Ethernet network, a wireless network, a proprietary network, a broadband cable network, or combination thereof. The Internet or other public network may be particularly useful as network 104 when the client computer systems 102 are widely distributed from the application server 106 as communications between these systems will be facilitated. Similarly, a corporate intranet may serve as network 104 for communications with an internal corporate computing environment. Those skilled in the art will recognize, however, that the invention described herein may be implemented utilizing any type of data communications channel or combinations of data communication channels.

Application sever 106 may be a server computer in a computer network dedicated to running particular software applications such as an organization's back-end applications 116, such as back-end business applications or databases. Application server 106 may be one or more of any type of computer system, including servers, personal computers, workstations, mainframe computers, notebook or laptop computer, desktop computers, or the like. In some embodiments, the application server 106 may be a computer system as described in relation to FIG. 2. Application server 106 may meet standards such as Java Platform, Enterprise Edition (Java EE™, formerly known as J2EE™) by Sun Microsystems, Inc. An example application server is International Business Machine's (IBM®'s) WebSphere® Application Server (WAS) that may serve as middleware to set up, operate, and integrate e-business applications across multiple computing platforms using Web technologies. Application servers may utilize, for example, a database management system such as IBM®'s DB2® Universal Database or Xara Online's (a subsidiary of Xara Group Ltd, of Hemel Hempstead, UK) Web applications to build a database platform or other remotely hosted applications. These database management systems allow users with appropriate authorization to add or update database records via a user interface, which is often browser-based.

Application server 106 may include one or more back-end applications 116 and a spreadsheet record processor 118. Back-end (or backend) applications 116 may be any application that may be used to provide services, content, or information to a user at a remote client computer system 102, and may include back-end business components such as business applications or back-end databases. The back-end applications 116 may optionally store information on database 110. As described in more detail in relation to FIGS 3 and 5, the spreadsheet record processor 118 may receive a request to process a spreadsheet to a particular back-end business component of a back-end application 116 and may then proceed to process that spreadsheet using the requested back-end application 116. To process the records of a spreadsheet, the spreadsheet record processor 118 may sequentially process each record of the spreadsheet by referencing a configuration file associated with that spreadsheet. A spreadsheet record processor 118 may accordingly generate a business object based on the configuration file and the particular record, and may next pass the record to the appropriate back-end application 116 for processing and updating of its database. The disclosed system may therefore advantageously utilize existing business processes or validation code built into the back-end application 116 without having to create new database-layer business processes or validation logic. In some embodiments, the spreadsheet record processor 118 may also include a usability tool to assist users in generating configuration files for a particular spreadsheet, as described in more detail in relation to FIG. 4.

In one example, a member of a human resources (HR) department of a large organization may wish to update various types of employee information in HR back-end applications 116, such as when employees join the organization. In this example, the HR employee may include the appropriate changes in a spreadsheet, such as a spreadsheet configured to include information about new employees such as name, Social Security number, start date, supervisor name, and the like. The HR employee may request processing of the spreadsheet from the spreadsheet record processor 118. The spreadsheet record processor 118 may then process each entry, create and populate a business object based on each entry, and submit each new business object to the appropriate back-end application 116 and component. In this example, the spreadsheet record processor 118 may process the new employee spreadsheet and pass each business object to an employee HR back-end application 116. The employee HR back-end application 116 may perform validation and/or business processes on each entry, such as by validating that the user has authority to add new employees, notifying payroll of the new employee, notifying security of the new employee, etc. These validation and business processes may be performed by the back-end application 116 as if the data was submitted through its user interface, eliminating the need to special code to handle spreadsheet-based entries. Using the disclosed system, a user may thus efficiently update back-end databases while validation and business processes are still maintained.

Figure 2:
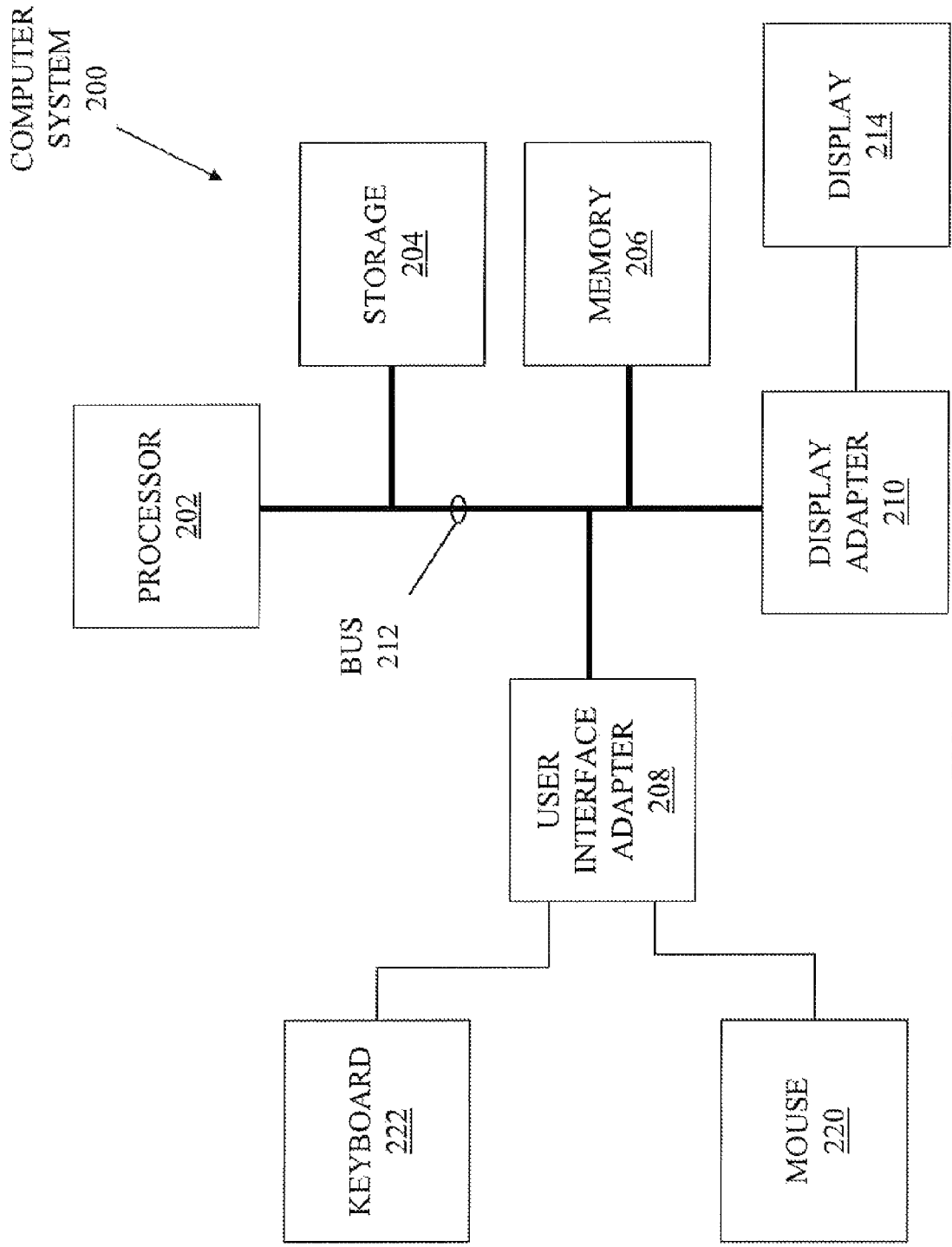
FIG. 2 depicts a block diagram of one embodiment of a computer system suitable for use as a component of the spreadsheet record processing system, such as a client computer system or an application server.

FIG. 2 depicts a block diagram of one embodiment of a computer system 200 suitable for use as a component of the spreadsheet record processing system 100, such as a client computer system 102 or an application server 106. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. Operations of various applications of the spreadsheet record processing system 100, such as the spreadsheet record processor 118, may execute on a processor 202. The processor 202 may utilize storage 204, which may be non-volatile storage such as one or more hard drives, tape drives, diskette drives, CD-ROM drive, DVD-ROM drive, or the like. The processor 202 may also be connected to memory 206 via bits 212, such as via a memory controller hub (MCH), System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. Using a user input device such as a mouse 220 or keyboard 222, a user may modify or fill out a spreadsheet and request processing of the spreadsheet. The bus 212 may also connect the processor 202 to a display 214, such as an LCD display or CRT monitor, via the display adapter 210.

Figure 3:
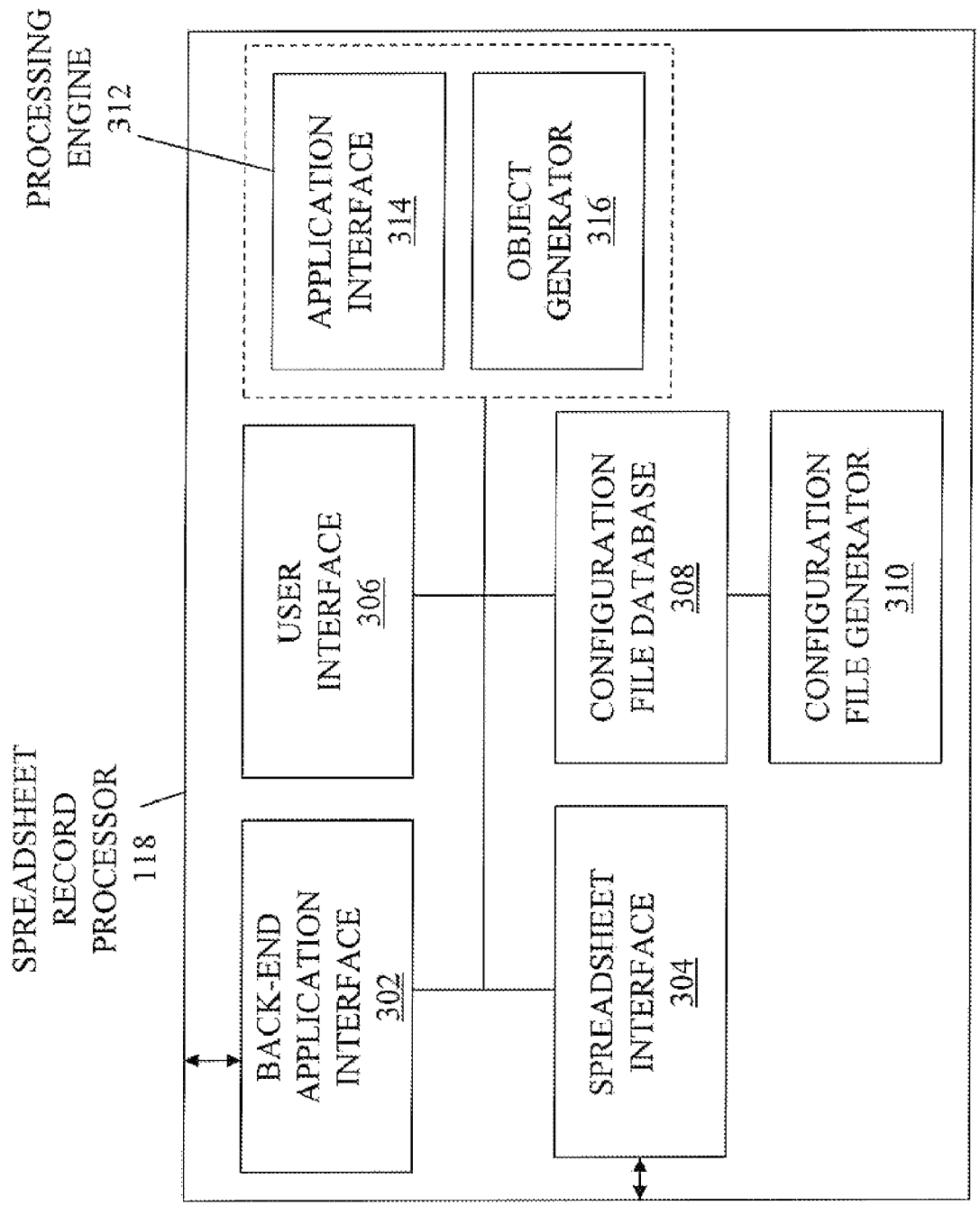
FIG. 3 depicts a conceptual illustration of software components of a spreadsheet record processor according to one embodiment.

FIG. 3 depicts a conceptual illustration of software components of a spreadsheet record processor according to one embodiment. The spreadsheet record processor 118 may execute on components of an application server 106 in some embodiments. In other embodiments, one or more components of the spreadsheet record processor 118 may execute on a client computer system 102. One of ordinary skill in the art will recognize that the components of the spreadsheet record processor 118 may execute on one or more of the components of the spreadsheet record processing system 100. As described previously, the spreadsheet record processor 118 maybe a stand-alone program or may be integrated into another program, such as a back-end application 116. A stand-alone spreadsheet record processor 118 may be able to interface with a plurality of back-end applications 116. In the depicted embodiment, the spreadsheet record processor 118 includes a back-end application interlace 302, a spreadsheet interface 304, a user interface 306, a configuration file database 308, a configuration file generator 310, and a processing engine 312.

The back-end application interface 302 may facilitate communication to and from any back-end applications 116 of the application server 106. In one embodiment, for example, the back-end application interface 302 may transmit a generated business object to the appropriate component of a back-end application 116 for processing. The back-end application interface 302 may also receive information from the back-end application 116 component, such as a confirmation of a successful processing or an error message. The spreadsheet interface 304 of the spreadsheet record processor 118 may facilitate access to spreadsheets, such as spreadsheets stored with a spreadsheet application 114, on a client computer system 102, on database 110, or on application server 106. In some embodiments, the spreadsheet interface 304 may receive a spreadsheet to be processed as part of a processing request transmitted over network 104. The user interface module 306 may receive user input from user input devices such as a mouse 220 or keyboard 222 and may also provide output to a user, such as via a display 214 or speaker. In some embodiments, the user with which die user interface module 306 interacts may be a software engineer generating or storing configuration files.

The configuration file database 308 of the spreadsheet record processor 118 may store one or more configuration files associated with different types of spreadsheets. In one embodiment, each type of spreadsheet may have a configuration file with which it is associated. For example, specific configuration files for an HR department may exist for a new employee spreadsheet, a terminating employee spreadsheet, a laptop spreadsheet, or any type of spreadsheet that may be utilized to enter information into a database. Alternatively, the configuration files may be stored in another location instead of the configuration file database 308, such as database 110.

A configuration file may include information such as an identification of the spreadsheet type, the name of a business object that represents a record of data in the spreadsheet, metadata for each column of the spreadsheet document, the name of the collection structure if a column maps to a collection of objects, the name of the back-end business component that should be invoked to process the business object, or other types of information. If the business object is composed of another business object, then metadata describing the composition may also be included in the configuration file (i.e., the fields of the child/inner business object are also mapped to columns of the spreadsheet). The same may also be applicable to the inner/child business object it could also contain another business object). Note that in the case where a business object contains another business object, a record in the spreadsheet may be constituted of one or more spreadsheet rows. As an example, a user may desire to submit an update for a computer system using a spreadsheet to a system whose back-end processes require IP addresses for the computer system to be submitted simultaneously with any updates. In this example, the spreadsheet may have a parent business object (the computer system) with one or more IP addresses, each of which is also a business object. A computer system with multiple IP address may in this example have multiple spreadsheet rows of data, each with their own IP address. One skilled in the art will recognize that spreadsheets compatible with the disclosed system may include any combination or types of records, including recursive referencing of business objects.

The configuration file may be in any format, such as an XML (extensible Markup Language) format. In some embodiments, a user may utilize a configuration file generator 310 to generate a configuration file for a type of spreadsheet. As described in more detail in relation to FIG. 4, the configuration file generator 310 may solicit and receive input from a user regarding a particular type of spreadsheet which it may then use to generate a configuration file for the spreadsheet type, allowing it to serve as a usability tool to help a software engineer create a properly-formatted configuration file. Alternatively, an experienced user (such as a software engineer) could manually create a configuration file and store it in the configuration file database 308.

The processing engine 312 of the spreadsheet record processor 118 may create and populate a new business object for each record of a spreadsheet. For each new business object, the processing engine 312 may pass the new business object to the appropriate back-end business component of a back-end application 116. The back-end application 116 may then validate the business object or perform any business processes on it before updating its back-end database by adding or updating database records. The processing engine 312 may include an application interface 314 and an object generator 316 to assist it in performing its tasks. The object generator 316 may create and populate new business objects based on the appropriate configuration file and the spreadsheet record. For example, the object generator 316 may use the configuration file for a spreadsheet type and create a business object for each record of the spreadsheet based on the contents of the rows that constitute the record, using the configuration file to 'translate' the spreadsheet contents into a format suitable for the back-end component. The application interface 314 may take the created business objects and pass them to the specified back-end application 116 (and its particular back-end business component). The particular back-end application 116 for processing records of a spreadsheet may be specified in the configuration file. The application interface 314 may also receive communications from the back-end business application 116, such as confirmations of successful processing or error messages.

Figure 4:
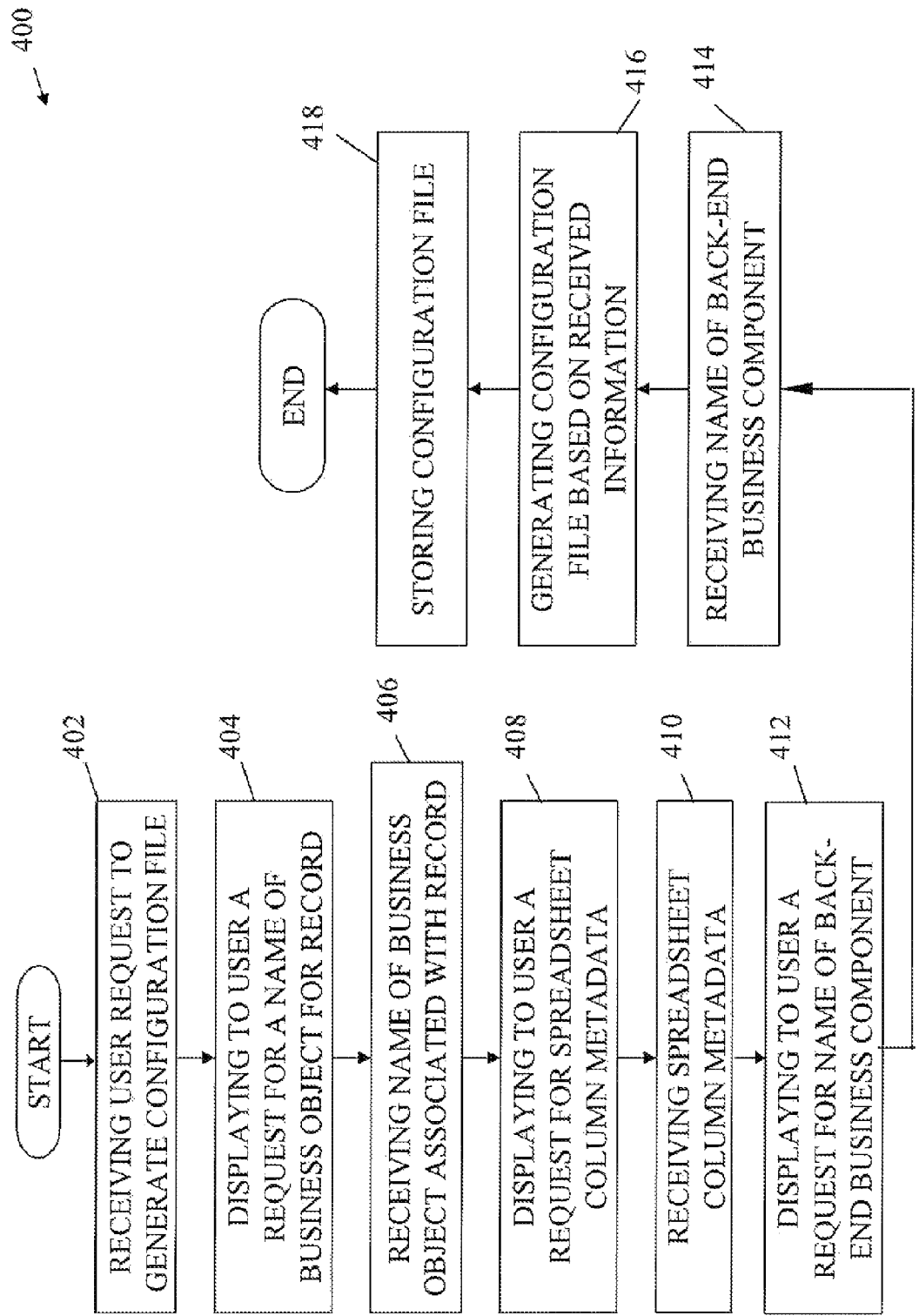
FIG. 4 depicts an example of a flow chart for generating a configuration file according to one embodiment.

FIG. 4 depicts an example of a flow chart for generating a configuration file according to one embodiment. In one embodiment, a configuration file generator 310 may perform the elements of flow chart 400. In the depicted embodiment, flow chart 400 begins with element 402, where the configuration file generator 310 may receive a user request to generate a configuration file for a spreadsheet type. The configuration file generator 310 may use, in some embodiments, a graphical user interface (GUI) to receive the request to generate a configuration file and to perform other steps of flow chart 400.

After receiving a request to create a configuration file, the method of flow chart 400 may continue to element 404, where the configuration file generator 310 may display to the user a request for a name of the business object associated with each record of the spreadsheet type. The configuration file generator 310 may next receive the name of the business object from the user at element 406. The business object may be any item that represents a record of data in a spreadsheet document. For example, in an object-oriented language such as Java®, the business object would be the class name for the data transfer object that will hold the data contained in the spreadsheet record. In a language like 'C' or its progeny, the business object may be a programming structure. The business object may accordingly be the type of object (or structure) that should be instantiated at runtime by the processing engine 312 to process the spreadsheet record. As an example, a spreadsheet designed to add new employees to a Human Resources (HR) database for an organization may utilize an employee object as the business object for each record of the spreadsheet The configuration file generator 310 may next display to a user a request for spreadsheet column metadata at element 408 and may then receive spreadsheet column metadata from the user at element 410. The metadata for a spreadsheet column may include the name or index of the column and the name of the property to set in the business object. For example, in Java® the name of the property to set would be the name of the setter method to invoke on the data transfer object. The property name metadata may accordingly provide for mapping of the field of a spreadsheet row to the field in a programming object. Each column may also be mapped to a corresponding structure that represents its type of data (the object type of the property to set in the business object). In Java®, for example, the object type may be the class name of the property to be set in the data transfer object. In this example, if the type of object is a 'Date', then the name of the Data class may also be mapped to the column name. One skilled in the art will recognize that any-type of data may be used, such as text, strings, dates, integers, numbers, or other information, in the previous example of an HR new employee spreadsheet, columns may represent data such as first name, last name, employee hire date, department, Social Security number, birth date, or any other type of information. In this example, first name and last name may be of type 'string', birth date of type 'date', and so on.

For spreadsheet columns that map to a collection of objects, the name of the collection structure may also be included in the metadata for the column. The object type of the elements that should be inserted into the collection may also be specified. In the HR new employee example, the collection of objects could be a list of backup contacts for the new employee, with each contact being represented by a string object. For the ease of an object collection, a delimiter may be used when entering the data in the spreadsheet column (e.g., a comma or semicolon). In another example, a list of hostnames may be separated by a comma delimiter. In this example, a string object may be created for each hostname and then inserted into the collection object. The collection holding the hostnames may then be set as a property of the business object.

The configuration File generator 310 may then display to the user a request for the name of the back-end business component associated with the spreadsheet at element 412 and may receive the name at element 414. The back-end business component may be the component of a back-end application 116 that should be invoked by the processing engine 312 of the spreadsheet record processor 118 at runtime. The component name may be the name of the actual component in some embodiments, allowing the processing engine 312 to access a naming server or other list to identify the location of the component when different computer processes are being used.

Once information is received from the user, the configuration file generator 310 may generate a configuration file based on the received information at element 416 and may store the configuration file at element 418, after which the method terminates. The configuration file may be in any format, including but not limited to XML format. The configuration file generator 310 may store the configuration file in any location, such as the configuration file database 308, on the client computer system 102, or on database 110.

Figure 5:
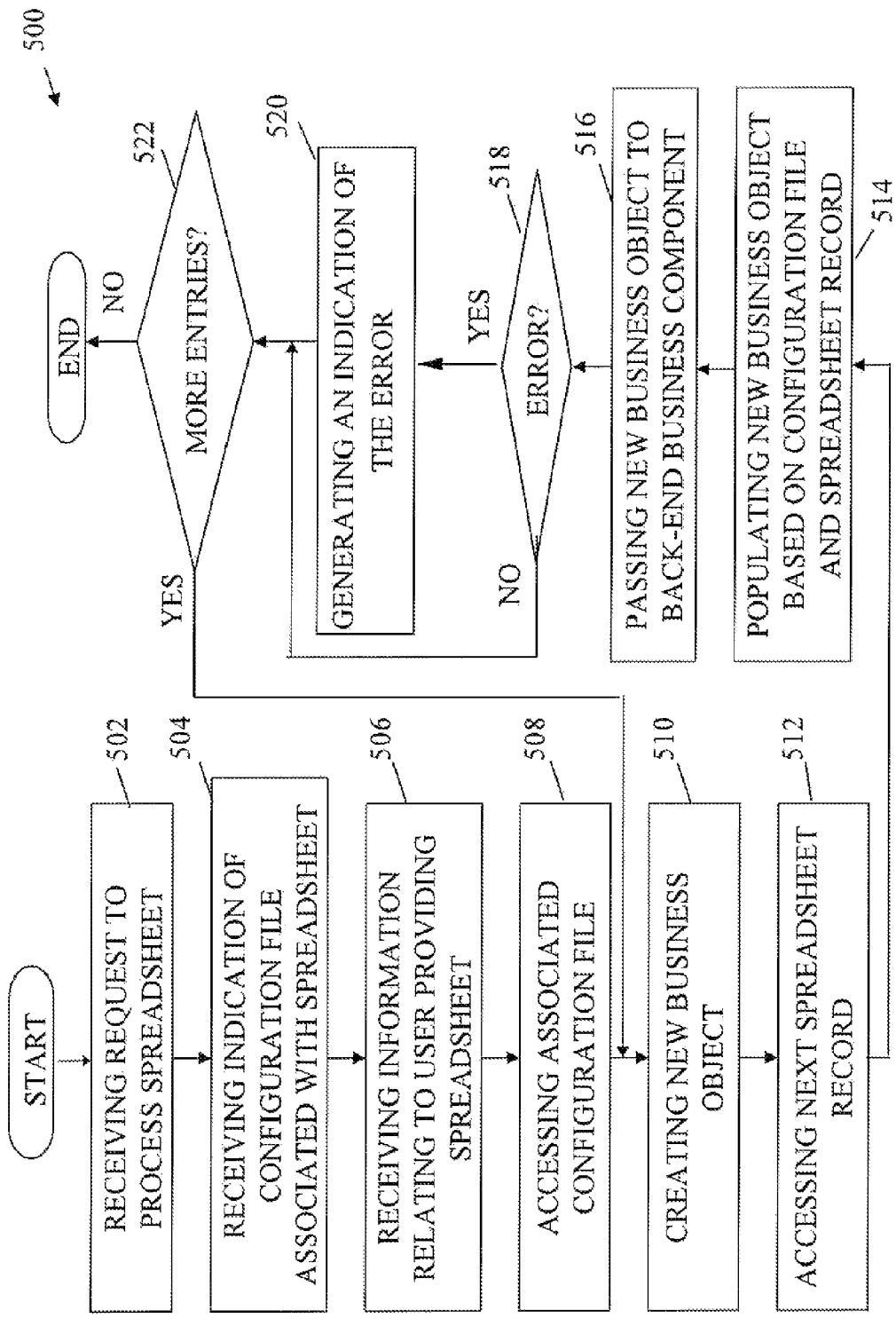
FIG. 5 depicts an example of a flow chart for processing a spreadsheet by creating and populating business objects for each record of the spreadsheet according to one embodiment.

FIG. 5 depicts an example of a flow chart for processing a spreadsheet by creating and populating business objects for each record of the spreadsheet according to one embodiment. In one embodiment, components of the spreadsheet record processor 118, such as the processing engine 312, may perform the elements of flow chart 500. In the depicted embodiment, flow chart 500 begins with element 502, where the spreadsheet record processor 118 may optionally receive a request to process the records of a spreadsheet The request to process a spreadsheet may include the spreadsheet itself, an indication of the name or location of the spreadsheet, or other information to allow the spreadsheet record processor 118 to access the spreadsheet. In some embodiments, the user interface 306 may receive input from a user requesting such processing. In other embodiments, the spreadsheet record processor 118 may receive such a request from other components of the spreadsheet record processing system 100. In yet other embodiments, the spreadsheet record processor 118 may determine to process a particular spreadsheet based on its own internal algorithms, eliminating the need to receive a request at element 502.

The spreadsheet record processor 118 may optionally receive an indication of a configuration file associated with the spreadsheet at element 504 and may also optionally receive information relating to the user providing the spreadsheet at element 506. In some embodiments, the information received at elements 504 and 506 may be received as part of the request to process a spreadsheet at element 502. The indication of the configuration file associated with the spreadsheet may be an actual configuration file, a configuration file name, an indication of the spreadsheet type, a file location, or any other information. The user information may include a name of the user, authentication information such as user id and password, or other information. Alternatively, the spreadsheet record processor 118 may determine the user information by grabbing the information from the computing environment (i.e., if the user logged in) or by other means. After receiving or determining the information, the spreadsheet record processor 118 may next access the associated configuration file at element 508 based on the indication of the configuration file. For example, the spreadsheet record processor 118 may receive the name or other indication of the configuration file and access the appropriate file in the configuration file database 308. In other embodiments, the spreadsheet record processor 118 may receive the configuration file with the request for processing. In other embodiments, the spreadsheet record processor 118 may find the configuration file with the spreadsheet file.

The spreadsheet record processor 118 may next process the rows of the spreadsheet after receiving the necessary information. At element 510, the object generator 316 of the processing engine 312 may create a new business object for the next record of the spreadsheet (i.e., the next record of the spreadsheet that has not yet been processed). The type of new business object may depend on the type specified in the configuration file for that spreadsheet. The object generator 316 may then access the next spreadsheet record (i.e., the next row of the spreadsheet) at element 512 and populate the new business object based on the configuration file and the spreadsheet record at element 514. The object generator 316 may use information from the configuration file, such as the column metadata information and object types, to process each row of the spreadsheet and to map the spreadsheet contents into the newly created business object. The application interface 314 of the processing engine 312 may access the business object created by the object generator 316 and pass it to the back-end business component of a back-end application 116 specified in the configuration file. The application interface 314 may also pass user information, such as a name or authentication information, to the back-end business component so that such access is authorized. Alternatively, the name or authentication information may be included in the business object. The back-end business component may process the business object using its validation and/or business processes logic, such as by processing the business object into a back-end database. By creating a business object suitable for a back-end business component, the validation and business processes logic of the back-end business component may advantageously be utilized without the necessity of creating database-layer equivalent logic. The back-end business component may process each business object as if they were submitted manually through its user interface.

If processing of the record by the back-end business component is successful and no error occurs at decision block 518, the spreadsheet record processor 118 determines at decision block 522 if there are more entries, or rows, of the spreadsheet to he processed. If there are more rows (as determined at decision block 522), the method of flow chart 500 returns to element 510 for processing of the next record. In this fashion, each record in a spreadsheet may be sequentially processed and passed to the appropriate back-end business component. Once all records of the spreadsheet have been processed, the method of flow chart 500 may then terminate.

If an error in processing does occur at decision block 518, the spreadsheet record processor 118 may optionally handle such error. An error may occur if, for example, the back-end business component determines that the business object has incomplete or incorrect information, the user is not authorized, or any other violations of the validation or business processes logic. The back-end business component may transmit an indication of the error (or optionally a confirmation of no errors) to the application interface 314 of the processing engine 312. The spreadsheet record processor 118 may optionally generate an indication of the error at element 520. In some embodiments, the indication of the error may include saving any records into a spreadsheet that may be e-mailed or otherwise transmitted to the originating user. The original user may then make corrections to the spreadsheet and then resubmit the spreadsheet to the spreadsheet record processing system 100. In these embodiments, another document (which may also be provided to the user) may contain the specifics of the error information on the records that could not be processed. In other embodiments, all error information may be located in the same document or provided in another fashion, such as print-out, e-mail message, or a pop-up window in a GUI.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions.

Also, programs are comprised of variables and data structures that either reside locally to the program or are found in memory or on computer-readable tangible storage devices. In addition, various programs described hereinafter may be identified based upon the application for which they are implemented in a specific embodiment of the invention. However, it should be appreciated that any particular program nomenclature that follows is used merely for convenience, and thus the invention should, not be limited to use solely in any specific application identified and/or implied by such nomenclature.

It will be apparent to those skilled in the art having the benefit of this disclosure that the present invention contemplates methods, systems, and media for processing records of a spreadsheet. It is understood that the form of the invention shown and described in the detailed description and the drawings are to be taken merely as examples. It is intended that the following claims be interpreted broadly to embrace all the variations of the example embodiments disclosed.

What is claimed is:

1. A method for processing a record of a spreadsheet, the method comprising the steps of: a computer system receiving a request to process the spreadsheet for storage in a database, wherein the request includes one of the spreadsheet and information for accessing the spreadsheet; the computer system accessing a configuration file associated with the spreadsheet, wherein the configuration file comprises an identifier of an application for processing an instance of a data type associated with a record in the spreadsheet; wherein the configuration file further includes an identification of a spreadsheet type of the spreadsheet, a name of the data type associated with the record in the spreadsheet, metadata for a column of the spreadsheet, the identifier of the application for processing the instance of the data type, and metadata describing the composition of the data type; the computer system creating a new instance of the data type, the new instance forming a business object; the computer system populating the new instance of the data type based on the record and the configuration file associated with the spreadsheet; and the computer system passing the new instance of the data type to the application.

2. The method of claim 1, further comprising the step of: the computer system generating the configuration file, the configuration file further including metadata describing a composition of the data type.

3. The method of claim 1, further comprising the step of: the computer system generating an indication of an error in passing the new instance of the data type to the application.

4. The method of claim 1, wherein the step of the computer system receiving the request to process the spreadsheet comprises the computer system receiving additional information relating to a user associated with the spreadsheet.

5. The method of claim 1, wherein the step of the computer system receiving the request to process the spreadsheet comprises the computer system receiving an indication of the configuration file associated with the spreadsheet.

6. The method of claim 1, wherein the step of the computer system creating the new instance of the data type comprises the computer system accessing a second record of the spreadsheet.

7. A computer program product comprising one or more computer-readable tangible storage devices and computer-readable program instructions which are stored on the one or more storage devices and when executed by one or more processors, perform the method of claim 1.

8. A computer system comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

9. A computer program product for processing a record of a spreadsheet, the computer program product comprising: one or more computer-readable tangible storage devices; program instructions, stored on at least one of the one or more storage devices, to receive a request to process the spreadsheet for storage in a database, wherein the request includes one of the spreadsheet and information for accessing the spreadsheet; program instructions, stored on at least one of the one or more storage devices, to access a configuration file associated with the spreadsheet, wherein the configuration file comprises an identifier of an application for processing an instance of a data type associated with a record in the spreadsheet; wherein the configuration file further includes an identification of a spreadsheet type of the spreadsheet, a name of the data type associated with the record in the spreadsheet, metadata for a column of the spreadsheet, the identifier of the application for processing the instance of the data type, and metadata describing the composition of the data type; program instructions, stored on at least one of the one or more storage devices, to create a new instance of the data type, the new instance forming a business object; program instructions, stored on at least one of the one or more storage devices, to populate the new instance of the data type based on the record and the configuration file associated with the spreadsheet; and program instructions, stored on at least one of the one or more storage devices, to pass the new instance of the data type to the application.

10. The computer program product of claim 9, further comprising program instructions, stored on at least one of the one or more storage devices, to generate the configuration file.

11. The computer program product of claim 9, further comprising program instructions, stored on at least one of the one or more storage devices, to generate an indication of an error in passing the new instance of the data type to the application.

12. The computer program product of claim 9, wherein the program instructions to receive the request to process the spreadsheet receive additional information relating to a user associated with the spreadsheet.

13. The computer program product of claim 9, wherein the program instructions to receive the request to process the spreadsheet receive an indication of the configuration file associated with the spreadsheet.

14. The computer program product of claim 9, wherein the program instructions to create the new instance of the data type access a second record of the spreadsheet.

15. A computer system for processing a record of a spreadsheet, the computer system comprising: one or more processors, one or more computer-readable memories and one or more computer-readable tangible storage devices; program instructions, stored on at least one of the one or more storage devices for execution by at least one of the one or more processors via at least one of the one or more memories, to receive a request to process the spreadsheet for storage in a database, wherein the request includes one of the spreadsheet and information for accessing the spreadsheet; program instructions, stored on at least one of the one or more storage devices for execution by at least one of the one or more processors via at least one of the one or more memories, to access a configuration file associated with the spreadsheet, wherein the configuration file comprises an identifier of an application for processing an instance of a data type associated with a record in the spreadsheet; wherein the configuration file further includes an identification of a spreadsheet type of the spreadsheet, a name of the data type associated with the record in the spreadsheet, metadata for a column of the spreadsheet, the identifier of the application for processing the instance of the data type, and metadata describing the composition of the data type; program instructions, stored on at least one of the one or more storage devices for execution by at least one of the one or more processors via at least one of the one or more memories, to create a new instance of the data type, the new instance forming a business object; program instructions, stored on at least one of the one or more storage devices for execution by at least one of the one or more processors via at least one of the one or more memories, to populate the new instance of the data type based on the record and the configuration file associated with the spreadsheet; and program instructions, stored on at least one of the one or more storage devices for execution by at least one of the one or more processors via at least one of the one or more memories, to pass the new instance of the data type to the application.

16. The computer system of claim 15, further comprising program instructions, stored on at least one of the one or more storage devices for execution by at least one of the one or more processors via at least one of the one or more memories, to generate the configuration file, the configuration file further including metadata describing a composition of the data type.

17. The computer system of claim 15, further comprising program instructions, stored on at least one of the one or more storage devices for execution by at least one of the one or more processors via at least one of the one or more memories, to generate an indication of an error in passing the new instance of the data type to the application.

\* \* \* \* \*